Sept. 29, 1936.  A. L. STIGEN  2,055,915
MEANS TO CONTROL THE RATIO BETWEEN SEPARATED
CONSTITUENTS IN A CENTRIFUGAL SEPARATOR
Filed July 23, 1931

INVENTOR
Alf Lennart Stigen
BY
ATTORNEY

WITNESS:

Patented Sept. 29, 1936

2,055,915

UNITED STATES PATENT OFFICE 2,055,915

MEANS TO CONTROL THE RATIO BETWEEN SEPARATED CONSTITUENTS IN A CENTRIFUGAL SEPARATOR

Alf Lennart Stigen, Stockholm, Sweden, assignor to The De Laval Separator Company, New York, N. Y., a corporation of New Jersey Application July 23, 1931, Serial No. 552,637
In Sweden January 29, 1931

1 Claim. (Cl. 233—19)

When treating some kinds of liquids, particularly milk, in centrifugal separators a strong formation of foam often takes place, which entails great inconveniences in many respects. In order to avoid these inconveniences it has been proposed to use closed centrifuges for the treatment of the liquid. When using centrifuges in which whole milk is separated into two components, cream and skim milk, which discharge from the centrifugal bowl through separate outlets, it is important to maintain the proportion between skim milk and cream from the bowl as constant as possible. In connection with open centrifuges this requirement may easily be satisfied by providing level outlets whose distance from the bowl's axis of rotation is regulable. In closed centrifuges, however, this is not possible. In this type of machines the proportion between the discharging quantities of liquids depends, among other things, on the pressure of the liquids, e. g. the throughflow speed or the quantity of liquid supplied per time unit. If the pressure should vary for any reason, for instance, because a portion of the closed system becomes partly blocked, the proportion between the quantities of liquid will be changed.

Separators of this type are disclosed in the Hoffman Patent No. 1,101,548, the Howell Patent No. 1,257,235, the Miller Patent No. 1,731,313, and the Hall Patents, No. 1,100,872, No. 1,149,578 and No. 1,561,784.

Figure 1:
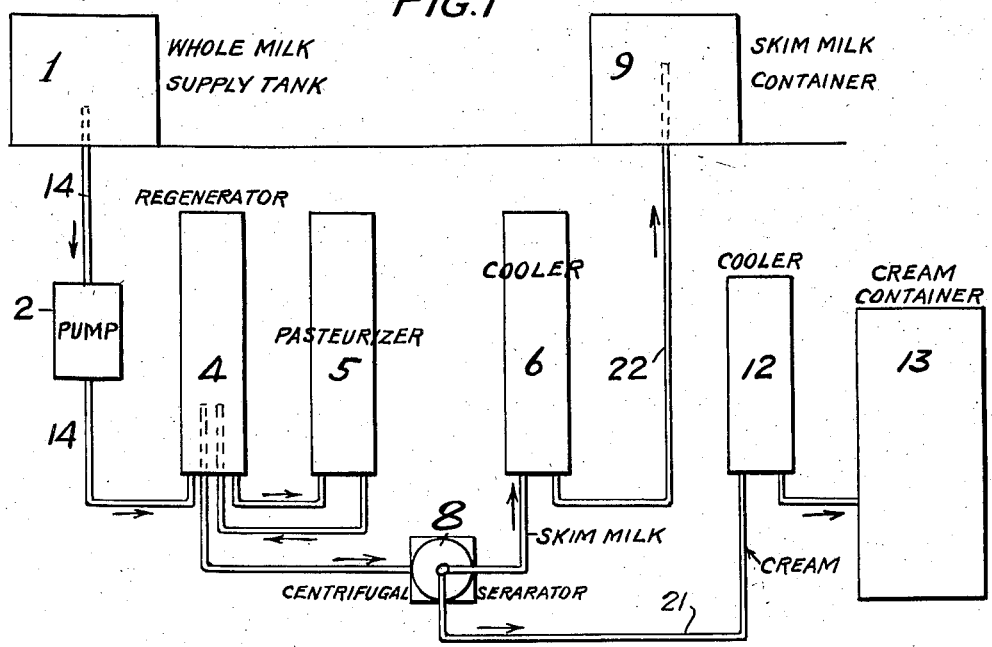
Figure 2:
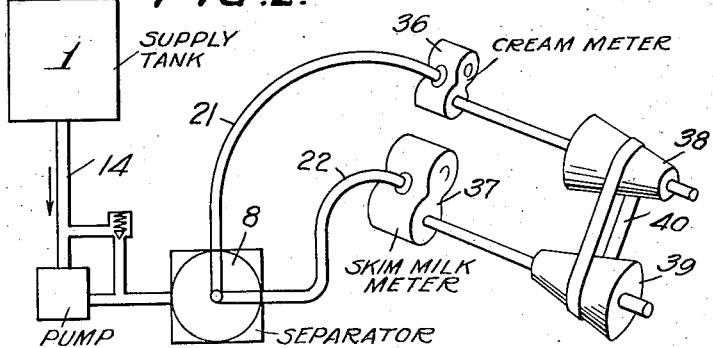

The present invention comprises means, applicable to a centrifugal separator in a closed system, but external thereto, for controlling and maintaining the ratio between the separated lighter and heavier constituents. In the drawing: Fig. 1 is a diagram of a typical dairy installation to which the regulating means illustrated in Fig. 2 is applied. Fig. 2 is a diagram of the means for controlling the ratio of flow of the two separated constituents through the respective discharge conduits of the centrifugal separator shown in Fig. 1.

Referring first to the dairy installations diagrammed in Fig. 1: From the container 1 for whole milk the milk is forced through pump 2 into the heating part of an open or closed regenerator 4, and then the pre-heated milk is led into a high temperature or a low temperature pasteurizer 5, from which the milk, after having been heated, flows back into the regenerator 4, where heat is transmitted to the cooling part of the apparatus. From this part of the regenerator a pipe for the somewhat cooled milk runs to a centrifugal separator 8, in which the whole milk is separated into skim-milk and cream. From the centrifuge separate branch pipes extend for conducting the skim-milk and the cream respectively, the said branch pipes being connected with separate systems of apparatus for treatment of the two products. The pipe for skim-milk, which should be tightly connected with the skim-milk outlet of the separator bowl, conducts the milk into one or more coolers 6 and then into the container 9 for skim-milk. The branch pipe for discharge of cream may connect with one or more cream coolers 12, possibly after the cream has passed through pasteurizer and de-gassing arrangements and finally to a container 13 for the cream.

To control the rates of flow of the skim milk and cream two gear pumps, 36, 37, operating as meters, are arranged respectively in the cream pipe 21 and skim-milk pipe 22. Suitable means are provided to regulate their respective speeds, as, for example, cone pulleys 38 and 39, driven from the shafts of the respective pumps and connected together by a belt 40. Since the entire discharge of the separator passes through the two meters, the ratio between the cream and the skim-milk will be the same as the ratio between the capacities of the two pumps.

While the invention has been described as applied to a dairy installation, wherein the mixture to be acted upon is whole milk and the liquids separated are milk and cream, in which installation the invention finds a highly useful application, it will be understood that the invention is applicable to any system in which the centrifugal separator is provided with closed inlet and outlet.

What I claim and desire to protect by Letters Patent is:

The combination with a centrifugal separator bowl, a feed conduit thereto and discharge conduits therefrom for separated constituents, the bowl being closed except to said conduits, of means adapted to control the ratio of flow of the two separated constituents through their respective discharge conduits; said means comprising two pumps operating as meters and arranged respectively in the two discharge conduits and means to regulate the respective speeds of said two pumps.

ALF LENNART STIGEN.